ns011277968B2

(12) United States Patent
Brammeier

(10) Patent No.: US 11,277,968 B2
(45) Date of Patent: Mar. 22, 2022

(54) SECONDARY STALK ROLLER

(71) Applicant: Deere & Company, Moline, IL (US)

(72) Inventor: Tyler S. Brammeier, Silvis, IL (US)

(73) Assignee: DEERE & COMPANY, Moline, IL (US)

( * ) Notice: Subject to any disclaimer, the term of this patent is extended or adjusted under 35 U.S.C. 154(b) by 62 days.

(21) Appl. No.: 16/366,748

(22) Filed: Mar. 27, 2019

(65) Prior Publication Data

US 2020/0305351 A1  Oct. 1, 2020

(51) Int. Cl.
*A01D 45/02* (2006.01)

(52) U.S. Cl.
CPC ......... *A01D 45/025* (2013.01); *A01D 45/023* (2013.01)

(58) Field of Classification Search
CPC .... A01D 45/025; A01D 45/023; A01D 47/00; A01D 82/02; A01D 45/021; A01D 45/02; A01D 57/01
See application file for complete search history.

(56) References Cited

U.S. PATENT DOCUMENTS

| 1,368,028 | A | * | 2/1921 | Dueker | A01D 45/02 56/110 |
| 1,764,686 | A | * | 6/1930 | Kuhlman | A01D 45/025 460/27 |
| 2,229,628 | A | * | 1/1941 | Anderson | A01D 45/025 56/111 |
| 2,234,447 | A | * | 3/1941 | Norman | A01D 45/025 460/32 |
| 2,341,248 | A |   | 2/1944 | Urschel |   |
| 2,587,857 | A | * | 3/1952 | Karlsson | A01D 45/025 460/31 |
| 2,651,163 | A | * | 9/1953 | Aasland | A01D 45/025 56/107 |
| 2,723,669 | A | * | 11/1955 | Pool | C13B 5/02 460/135 |
| 2,768,626 | A | * | 10/1956 | Pelowski | A01D 45/025 460/32 |

(Continued)

FOREIGN PATENT DOCUMENTS

| CN | 103314711 A | 9/2013 |
| DE | 224475 A5 | 7/1985 |

OTHER PUBLICATIONS

University of Wisconsin, Corn Agronomy, "Lodging in Corn Agronomy," <http://corn.agronomy.wisc.edu/Management/L040.aspx> originally written Feb. 1, 2006.

*Primary Examiner* — Alicia Torres
*Assistant Examiner* — Madeline I Runco
(74) *Attorney, Agent, or Firm* — Michael Best & Friedrich LLP

(57) ABSTRACT

A stalk roll assembly for a corn harvester includes a first stalk roll having a first elongate cylinder and rotates about a first axis, and a second stalk roll has a second elongate cylinder rotates about a second axis. A third stalk roll has a third elongate cylinder, is positioned above the first stalk roll and rotates about a third axis, and a fourth stalk roll has a fourth elongate cylinder, is positioned above the second stalk roll and rotates about a fourth axis. A first plate is positioned between the first stalk roll and the third stalk roll, and a second plate is positioned between the second stalk roll and the fourth stalk roll. The first and second stalk rolls are spaced apart to separate corn ears from corn stalks.

18 Claims, 11 Drawing Sheets

(56) References Cited

U.S. PATENT DOCUMENTS

| | | | | |
|---|---|---|---|---|
| 2,771,731 | A * | 11/1956 | Heth | A01D 45/025 56/104 |
| 2,842,929 | A * | 7/1958 | Schultz | A01D 45/025 460/34 |
| 2,854,806 | A * | 10/1958 | Slavens | A01D 45/021 56/103 |
| 2,906,083 | A * | 9/1959 | Rettig | A01D 45/021 56/111 |
| 3,069,832 | A * | 12/1962 | Baker | A01D 45/021 56/104 |
| 3,075,340 | A * | 1/1963 | Raney | A01D 45/025 56/104 |
| 3,127,723 | A * | 4/1964 | Procter | A01D 57/00 56/14.3 |
| 3,222,852 | A * | 12/1965 | Ward | A01D 45/025 56/104 |
| 3,398,515 | A * | 8/1968 | Ash | A01D 47/00 56/63 |
| 3,492,797 | A * | 2/1970 | Sears | A01D 45/021 56/14.1 |
| 3,640,055 | A * | 2/1972 | Looker | A01D 45/02 56/106 |
| 3,648,443 | A * | 3/1972 | Sears | A01D 45/021 56/111 |
| 3,687,568 | A * | 8/1972 | Looker | A01D 45/02 415/99 |
| 4,215,527 | A * | 8/1980 | Shriver | A01D 43/082 56/98 |
| 4,581,878 | A * | 4/1986 | Vida | A01D 45/021 460/26 |
| 4,999,983 | A * | 3/1991 | Britt | A01D 45/021 56/107 |
| 5,131,216 | A * | 7/1992 | Otten | A01D 45/10 56/121.44 |
| 5,878,559 | A | 3/1999 | Cooksey et al. | |
| 6,251,008 | B1 * | 6/2001 | Mietzel | A01F 11/06 460/32 |
| 7,373,767 | B2 * | 5/2008 | Calmer | A01D 45/025 56/51 |
| 7,395,649 | B2 * | 7/2008 | Wubbels | A01D 45/021 56/14.3 |
| 7,694,501 | B1 * | 4/2010 | Hinds | A01D 45/003 56/63 |
| 7,752,829 | B1 * | 7/2010 | Rottinghaus | A01D 45/021 56/110 |
| 8,181,434 | B2 * | 5/2012 | Rottinghaus | A01D 45/021 56/110 |
| 8,224,534 | B2 * | 7/2012 | Kowalchuk | A01D 45/021 701/50 |
| 8,935,908 | B2 * | 1/2015 | Surmann | A01D 45/021 56/119 |
| 9,295,196 | B2 * | 3/2016 | Surmann | A01D 57/01 |
| 9,750,187 | B2 * | 9/2017 | Walker | A01D 45/021 |
| 9,867,335 | B1 * | 1/2018 | Obbink | A01D 45/021 |
| 10,219,435 | B2 * | 3/2019 | Walker | A01D 45/025 |
| 2003/0079459 | A1 * | 5/2003 | Bongert | A01D 45/025 56/104 |
| 2004/0016219 | A1 * | 1/2004 | Calmer | A01D 45/025 56/51 |
| 2004/0123577 | A1 * | 7/2004 | Resing | A01D 45/025 56/104 |
| 2010/0071335 | A1 * | 3/2010 | Poeylaut | A01D 45/025 56/94 |
| 2012/0042623 | A1 * | 2/2012 | Lohrentz | A01D 45/021 56/113 |
| 2014/0083073 | A1 * | 3/2014 | Doerscher, Sr. | A01D 47/00 56/56 |
| 2016/0014961 | A1 * | 1/2016 | Force | A01D 61/008 56/10.2 A |
| 2017/0099775 | A1 * | 4/2017 | Barry | A01F 11/06 |

\* cited by examiner

SECONDARY STALK ROLLER

BACKGROUND

The present disclosure relates to corn harvesters.

SUMMARY

In some embodiments, the disclosure provides a stalk roll assembly for a corn harvester including a first stalk roll having a first elongate cylinder and being rotatable about a first axis, a second stalk roll having a second elongate cylinder and being rotatable about a second axis, a third stalk roll having a third elongate cylinder and being positioned above the first stalk roll and being rotatable about a third axis, and a fourth stalk roll having a fourth elongate cylinder and being positioned above the second stalk roll and being rotatable about a fourth axis. A first plate is positioned between the first stalk roll and the third stalk roll, and a second plate is positioned between the second stalk roll and the fourth stalk roll. The first and second stalk rolls are spaced apart to separate corn ears from corn stalks.

In some embodiments the disclosure provides a corn harvester including a work vehicle that moves along a ground surface, a crop divider that separates adjacent rows of corn stalks, a first stalk roll having a first elongate cylinder and being rotatable about a first axis, a second stalk roll having a second elongate cylinder and being rotatable about a second axis, a third stalk roll having a third elongate cylinder and being rotatable about a third axis, the third stalk roll being positioned above the first plate, and a fourth stalk roll having a fourth elongate cylinder and being rotatable about a fourth axis, the fourth stalk roll being positioned above the second plate. A first plate is positioned between the first stalk roll and the third stalk roll, and a second plate is positioned between the second stalk roll and the fourth stalk roll. The first and second stalk rolls are spaced apart to permit corn stalks to move between the first and second plates and to separate corn ears from corn stalks. A collection hopper stores harvested corn ears, and a conveyor moves separated corn ears toward the hopper. The conveyor is positioned between the first stalk roll and the third stalk roll, and is positioned between the second stalk roll and the fourth stalk roll.

In some embodiments the disclosure provides a stalk roll assembly for a corn harvester that moves along a ground surface. The stalk roll assembly includes a first stalk roll having a first elongate cylinder and extending at an acute angle with respect to the ground surface. The first stalk roll is rotatable about a first axis. A second stalk roll has a second elongate cylinder, extends at an acute angle with respect to the ground surface, and rotates about a second axis. A third stalk roll has a third elongate cylinder, extends at an acute angle with respect to a ground surface, and rotates about a third axis. A fourth stalk roll has a fourth elongate cylinder, extends at an acute angle with respect to the ground surface, and rotates about a fourth axis. The first stalk roll is positioned between the ground surface and the third stalk roll, and the second stalk roll is positioned between the ground surface and the fourth stalk roll.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

Figure 1:
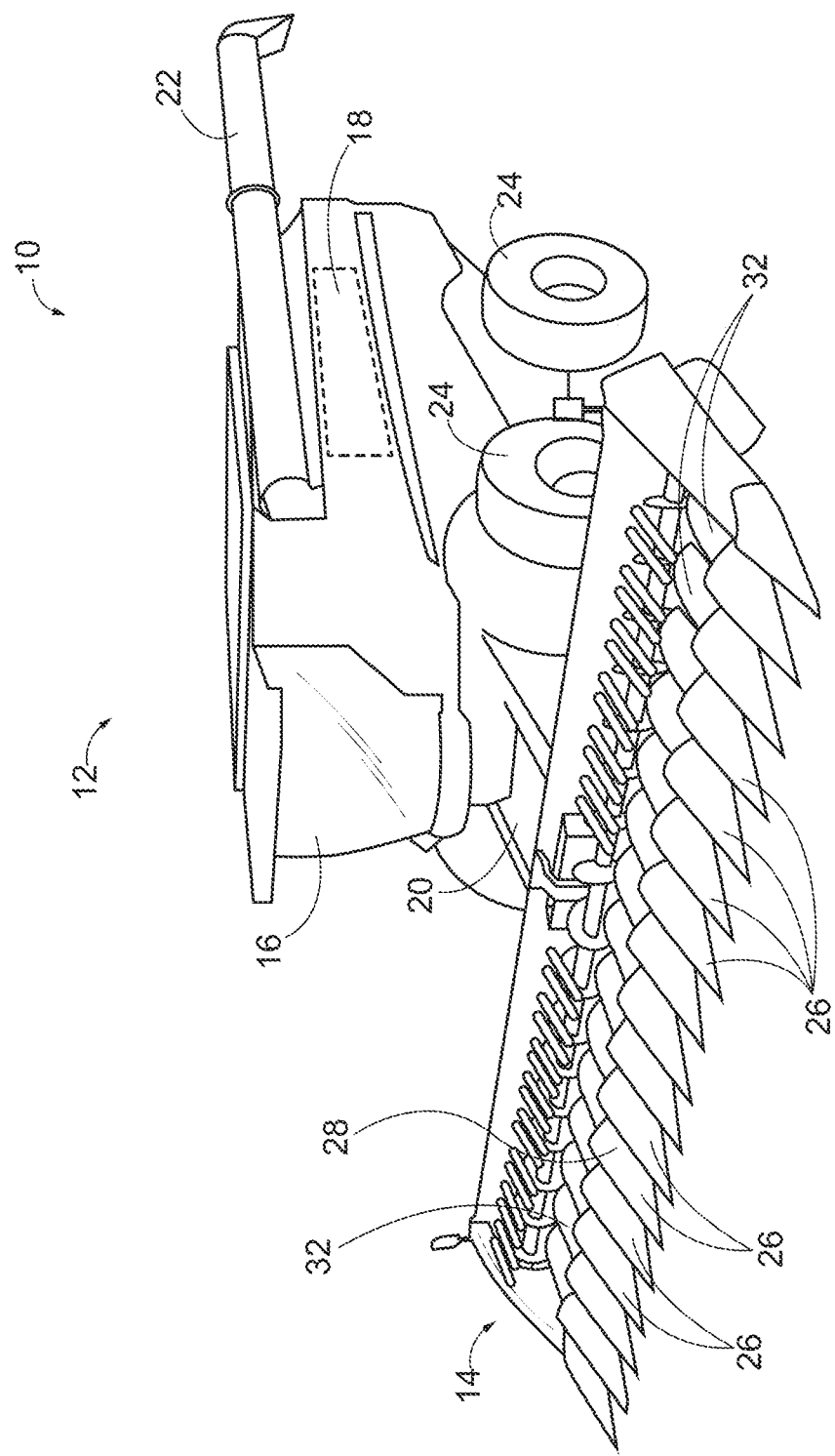
FIG. 1 is a perspective view of a corn harvester.

FIG. 1 illustrates a corn harvester 10 including a work vehicle 12 and a corn harvesting attachment 14. The illustrated work vehicle 12 includes an operator cab 16, an engine 18, a collection hopper 20, a dispensing chute 22, and a plurality of wheels 24. Other work vehicles can include tracks in place of the plurality of wheels. The illustrated corn harvesting attachment 14 includes a plurality of crop dividers 26 and a cross auger 28. Each of the crop dividers 26 includes a stalk roll cover 32 positioned behind the crop divider 26

Figure 2:
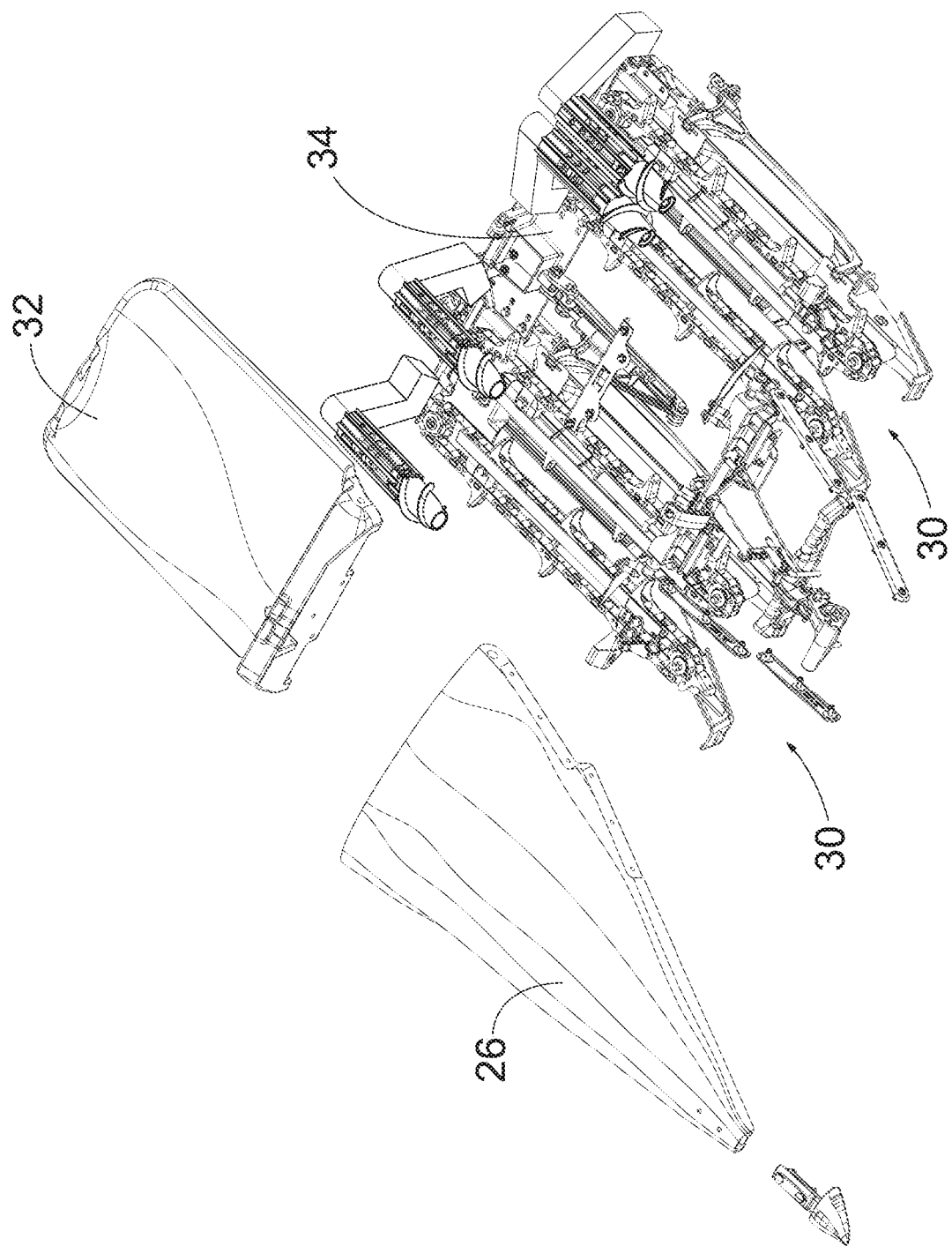
FIG. 2 is a partially exploded view of two corn stalk roll assemblies of FIG. 1.

FIG. 2 illustrates a pair of stalk roll assemblies 30 with a crop divider 26, a cover 32 positioned between the pair of stalk roll assemblies 30, and a frame 34. The crop divider 26 directs corn stalks toward one of the stalk roll assemblies 30. The cover 32 directs any harvested corn to the stalk roll assemblies 30 and inhibits any harvested corn from falling between the stalk roll assemblies 30 onto the ground. The stalk roll cover 32 is removed from the stalk roll assemblies 30 for clarity.

Figure 3:
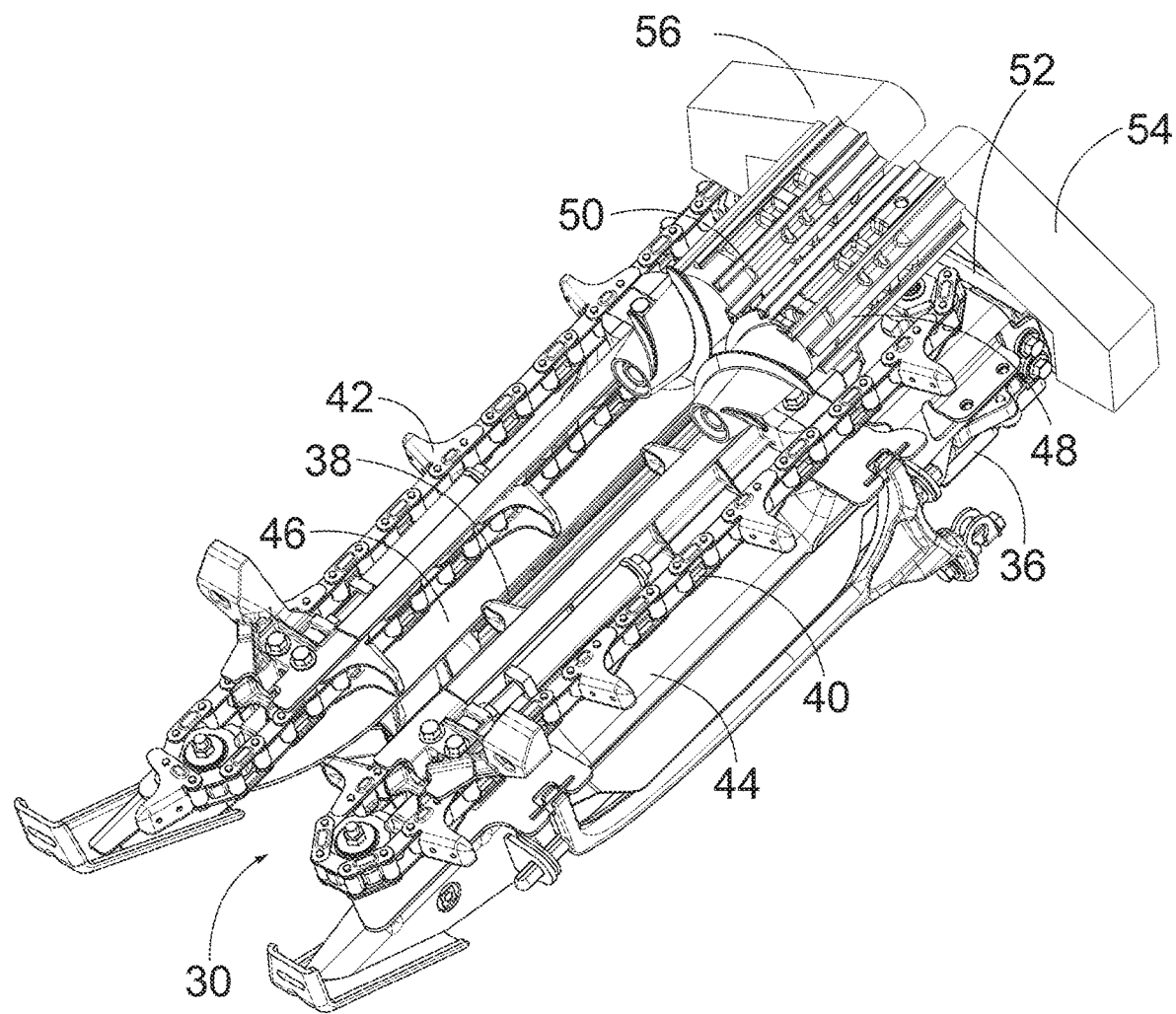
FIG. 3 is a top perspective view of one corn stalk roll assembly of FIG. 2.

FIG. 3 more clearly illustrates one such stalk roll assembly 30. The illustrated stalk roll assembly 30 includes a first stalk roll 36, a second stalk roll 38, a first gathering chain 40, a second gathering chain 42, a first plate 44, a second plate 46, a third stalk roll 48, a fourth stalk roll 50, a power source 52, a first support arm 54 and a second support arm 56.

Figure 4:
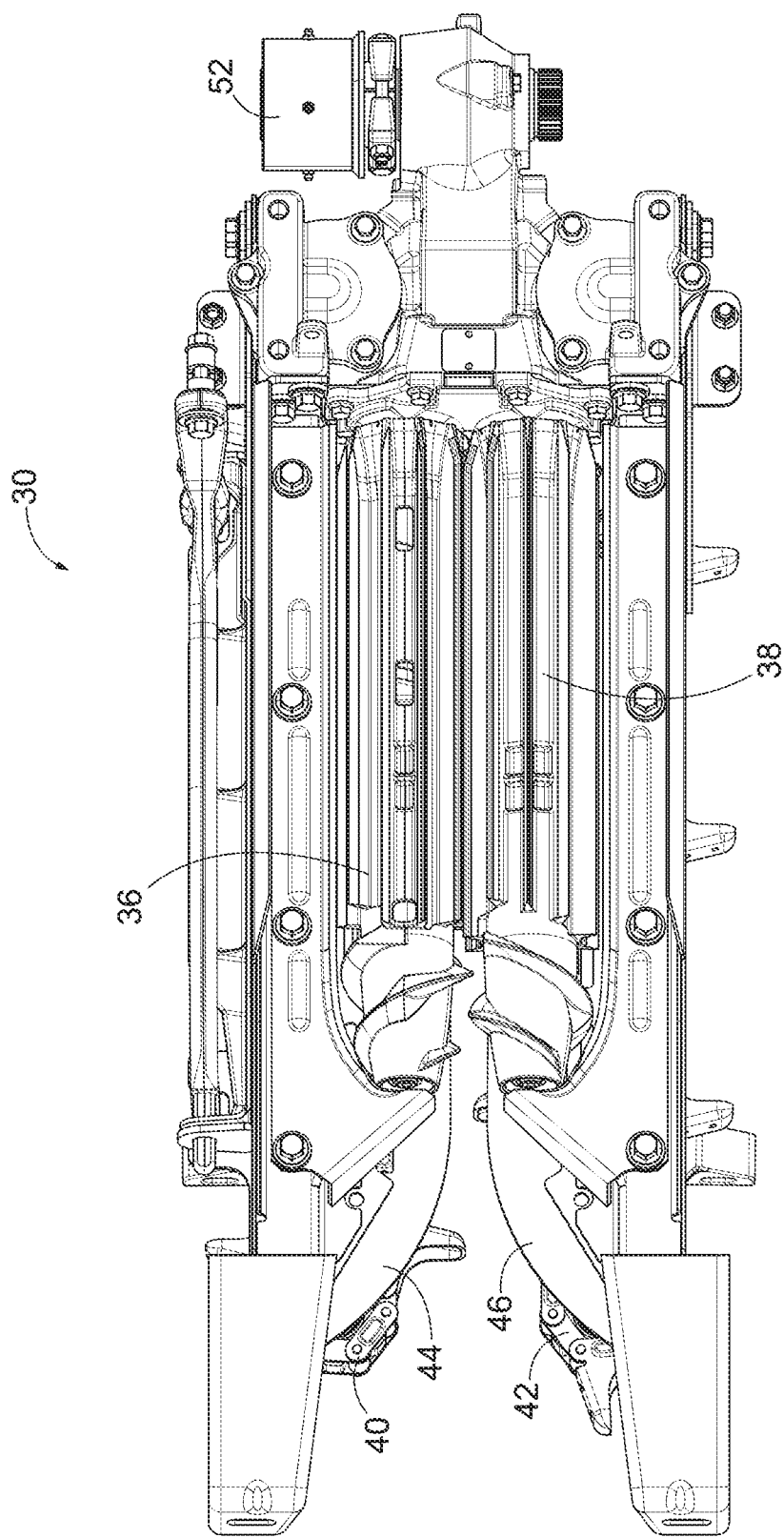
FIG. 4 is a bottom view of the corn stalk roll assembly of FIG. 3.

With reference to FIGS. 3 and 4, the first stalk roll 36 is coupled to a first portion of the frame 34 and includes a first elongate cylinder having a plurality of first blades spaced circumferentially around a perimeter of the first elongate cylinder, and a frustoconical tip. The first stalk roll 36 is configured to rotate about a first longitudinal axis in response to the power source 52. The illustrated first stalk roll 36 is rotated in the direction of arrow A, which is counter clockwise when viewed from the end with the frustoconical tip.

The second stalk roll 38 is coupled to a first portion of the frame 34 and includes a second elongate cylinder having a plurality of second blades spaced circumferentially around a perimeter of the second elongate cylinder, and a frustoconical tip. The second stalk roll is configured to rotate about a second longitudinal axis in response to the power source 52. The illustrated second stalk roll 38 is rotated in the direction of arrow B, which is clockwise when viewed from the end with the frustoconical tip. In the illustrated embodiment, the first longitudinal axis is parallel to the second longitudinal axis.

The first gathering chain 40 includes a plurality of lugs and is moveable in response to the power source 52. The second gathering chain 42 includes a plurality of lugs and is moveable in response the power source 52. The first and second gathering chains 40 and 42 are configured to convey harvested corn ears toward the collection hopper 20 (see FIG. 1).

The first plate 44 is positioned above the first stalk roll 36 and below the first gathering chain 40. The second plate 46 is positioned above the second stalk roll 38 and below the second gathering chain 42. The first plate 44 is spaced from the second plate 46 a distance that is greater than an average diameter of corn stalks but is less that an average diameter of harvested corn ears.

With reference to FIGS. 2 and 3, the third stalk roll 48 is coupled to the first support arm 54 and is positioned above the cover 32. The first support arm 54 is coupled to a second portion of the frame 34 and is rotatable with respect to the frame 34 between a lowered position and a raised position (see FIG. 2). The third stalk roll 48 can be raised to permit removal of the cover 32 and servicing of the stalk roll assembly 30. The third stalk roll 48 includes a third elongate cylinder having a plurality of third blades spaced circumferentially around a perimeter of the third elongate cylinder, and a frustoconical tip. The third stalk roll is positioned above the first plate 44. The third stalk roll is configured to rotate about a third longitudinal axis in response to the power source 52. The illustrated third stalk roll 48 is rotated in the direction of arrow C, which is counter clockwise when viewed from the end with the frustoconical tip. In the illustrated embodiment, the third longitudinal axis is parallel to the first longitudinal axis and to the second longitudinal axis.

With reference to FIGS. 2 and 3, the fourth stalk roll 50 is coupled to the second support arm 56 and is positioned above the cover 32. The second support arm 56 is coupled to the second portion of the frame 34 and is rotatable with respect to the frame 34 between a lowered position and a raised position (see FIG. 2). The fourth stalk roll 50 can be raised to permit removal of the cover 32 and servicing of the stalk roll assembly 30. The fourth stalk roll 50 includes a fourth elongate cylinder having a plurality of fourth blades spaced circumferentially around a perimeter of the fourth elongate cylinder, and a frustoconical tip. The fourth stalk roll 50 is positioned above the second plate 46. The fourth stalk roll 50 is configured to rotate about a fourth longitudinal axis in response to the power source 52. The illustrated fourth stalk roll 50 is rotated in the direction of arrow D, which is clockwise when viewed from the end with the frustoconical tip. In the illustrated embodiment, the fourth longitudinal axis is parallel to the first longitudinal axis, the second longitudinal axis and to the third longitudinal axis.

With reference to FIG. 4, the power source 52 is coupled to the first, second, third and fourth stalk rolls 36, 38, 48 and 50, and to the first and second gathering chains 40, 42. In some embodiments, the third and fourth stalk rolls 48, 50 can be rotated via a separate power source than the first and second stalk rolls 36, 38.

Figure 5:
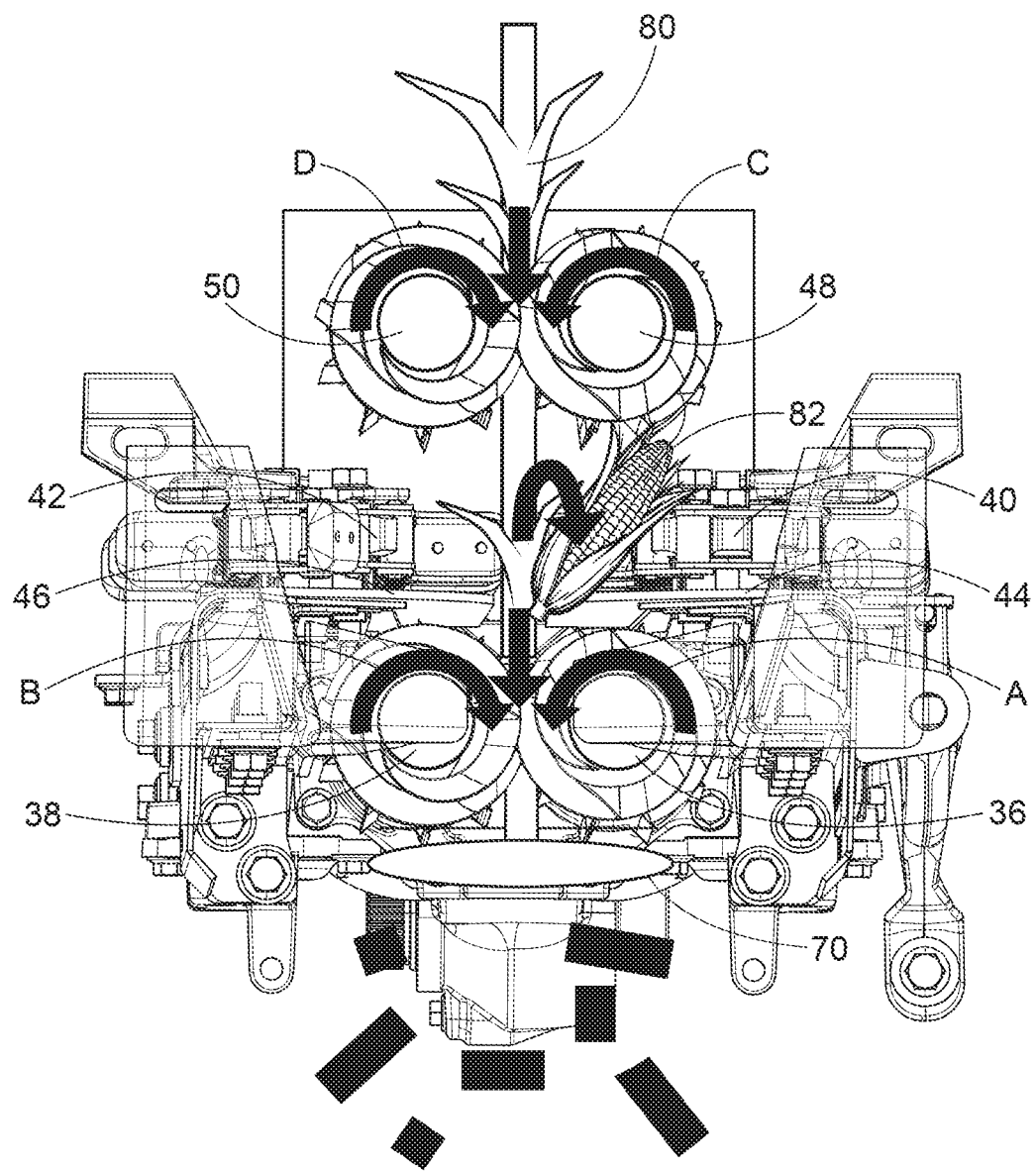
FIG. 5 is a front view of the corn stalk roll assembly.

As shown most clearly in FIG. 5, the first stalk roll 36 rotates in the direction of arrow A and the second stalk roll 38 rotates in the direction of arrow B to draw a corn stalk 80 down and a rotating blade 70 cuts the corn stalk 80 into pieces and dispense the pieces downward. Harvested corn ears 82 are retained on the first and second plates 44 and 46 and are thus stripped off of the corn stalk 80. The spacing between the first and second plates 44 and 46 permits the corn stalks to slide between the plates 44 and 46 but the first and second plates 44 and 46 retain harvested corn ears 82 on top of the plates 44 and 46.

The third stalk roll 48 rotates in the direction of arrow C and the fourth stalk roll 50 rotates in the direction of arrow D to separate corn ears 82 from the upper portion of the corn stalk 80. The third and fourth stalk rolls 48 and 50 orient the corn stalk 80 to engage the first and second stalk rolls 36 and 38 even if the corn stalk 80 breaks off. The corn ears 82 separated from the stalk 80 by the third and fourth stalk rolls 48 and 50 can either travel along a top of the third and fourth stalk rolls 48 and 50 toward the cross auger 28 or can be moved by the gathering chains 40 and 42 toward the cross-auger 28 (see FIG. 1).

While harvesting, if stalks are brittle or are relatively tall, the corn stalks can break while harvesting. The broken top of the corn stalk cannot easily be processed by the first and second stalk rolls 36 and 38, so the entire broken top of the corn stalk may be directed toward the cross auger 28 and hopper 20. The third and fourth stalk rolls 48 and 50 provide support for a top portion of the corn stalks to orient the top portion of the corn stalks to be processed properly by the first and second stalk rolls 36 and 38.

As shown most clearly in FIG. 5, the first plate 44 is positioned between the first stalk roll 36 and the third stalk roll 48, and the second plate 46 is positioned between the second stalk roll 38 and the fourth stalk roll 50. The first and second stalk rolls 36 and 38 are spaced apart to separate corn ears 82 from corn stalks 80. The first gathering chain 40 is positioned between the first stalk roll 36 and the third stalk roll 48, and the second gathering chain 42 is positioned between the second stalk roll 38 and the fourth stalk roll 50. The first stalk roll 36 is positioned between the ground surface and the third stalk roll 48, and the second stalk roll 38 is positioned between the ground surface and the fourth stalk roll 50.

Figure 6:
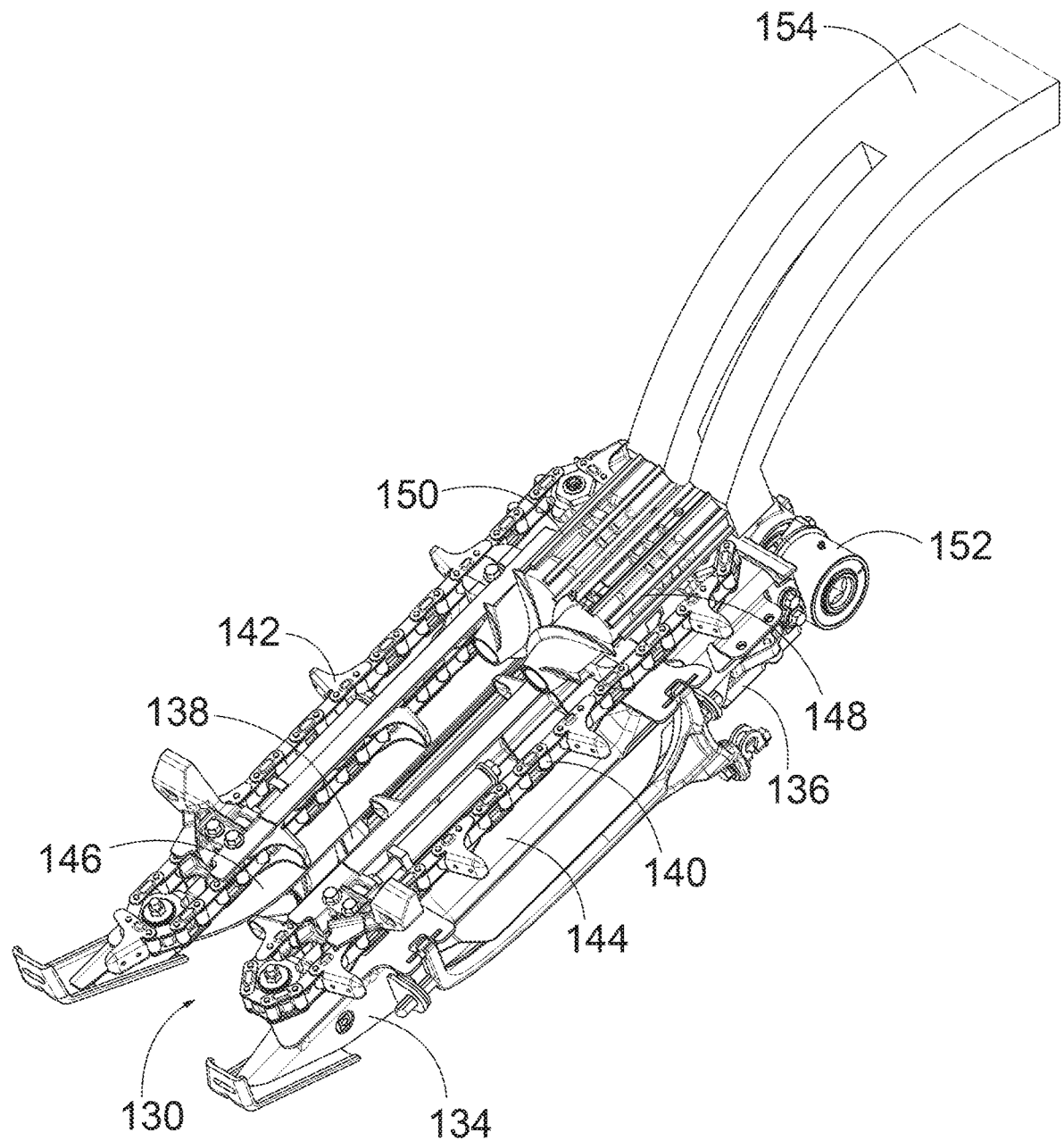
FIG. 6 is a top perspective view of one corn stalk roll assembly according to some embodiments.

FIG. 6 illustrates another embodiment of a stalk roll assembly 130 that includes a first stalk roll 136, a second stalk roll 138, a first gathering chain 140, a second gathering chain 142, a first plate 144, a second plate 146, a third stalk roll 148, a fourth stalk roll 150, a power source 152 and a support arm 154. The support arm 154 supports both the third stalk roll 148 and the fourth stalk roll 150. The remaining components are substantially identical to the embodiment of FIGS. 1-5.

With reference to FIGS. 7-11, the second stalk roll 138, the second gathering chain 142, the second plate 146, the fourth stalk roll 150 and the support arm 154 are shown. The first stalk roll 136, the first gathering chain 140, the first plate 144 and the third stalk roll 148 are substantial mirror images of the illustrated parts, but are removed for clarity.

Figure 7:
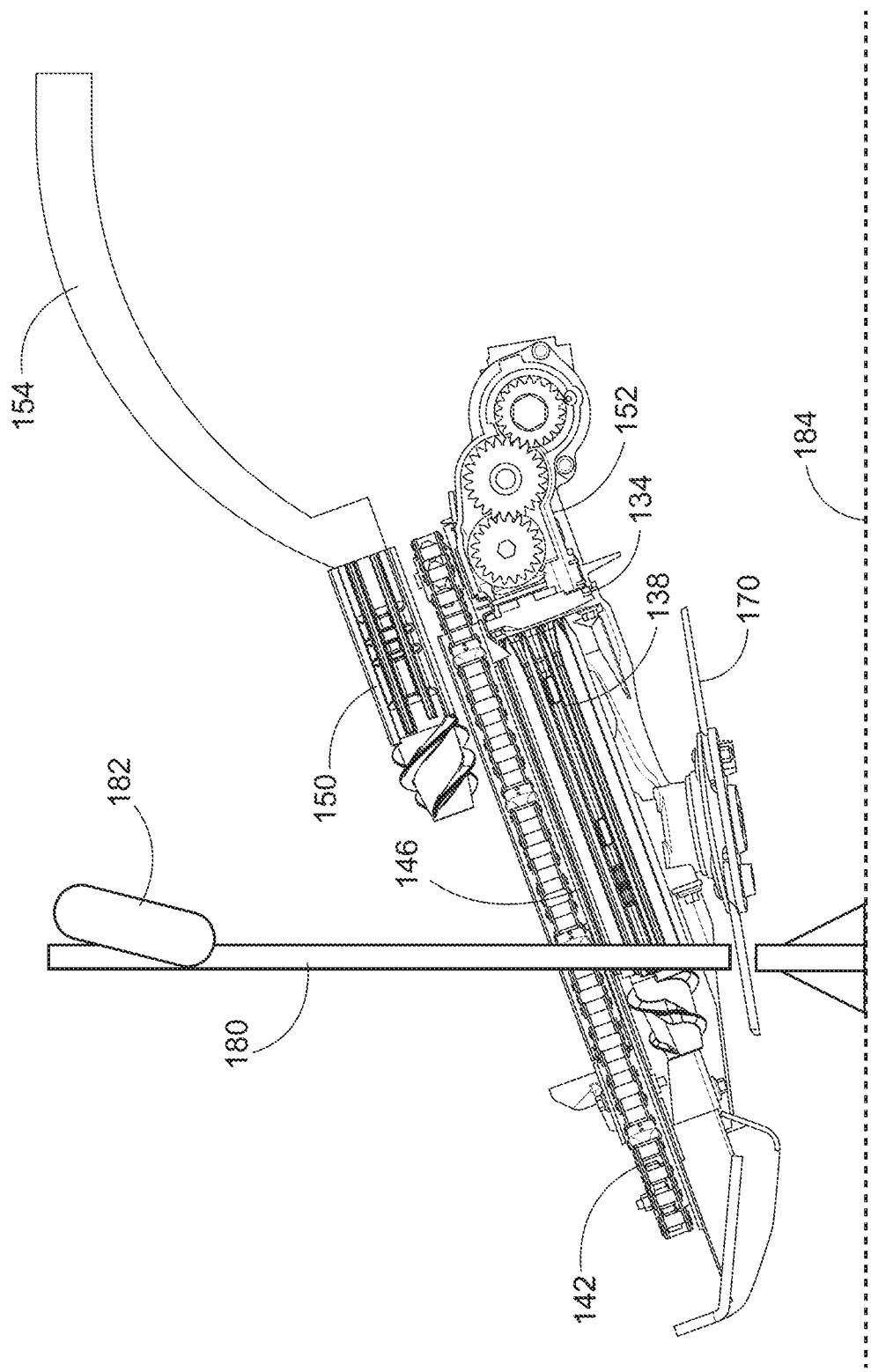
FIGS. 7-11 show side view of the corn stalk roll assembly in operation.

FIG. 7 illustrates that a single corn stalk 180 is cut from the root with the rotating blade 170 as the first and second stalk rolls 136 and 138 engage the corn stalk 180. The first and second stalk rolls 136 and 138 orient the cut corn stalk 180 substantially perpendicular to the first and second stalk rolls 136 and 138. The first and second stalk rolls 136 and 138 are coupled to a first portion of the frame 134 and the third and fourth stalk rolls 148 and 150 are coupled to a second portion of the frame 134, such that the first and second stalk rolls 136 and 138 engage the corn stalk 80 before the third and fourth stalk rolls 148 and 150 engage the corn stalk 180.

The first and second stalk rolls 136 and 138 are oriented at an acute angle with respect to a ground surface 184. The third and fourth stalk rolls 148 and 150 are oriented at an acute angle with respect to the ground surface 184. The first and second stalk rolls 136 and 138 are positioned closer to the ground surface 184 than the third and fourth stalk rolls 148 and 150.

Figure 8:
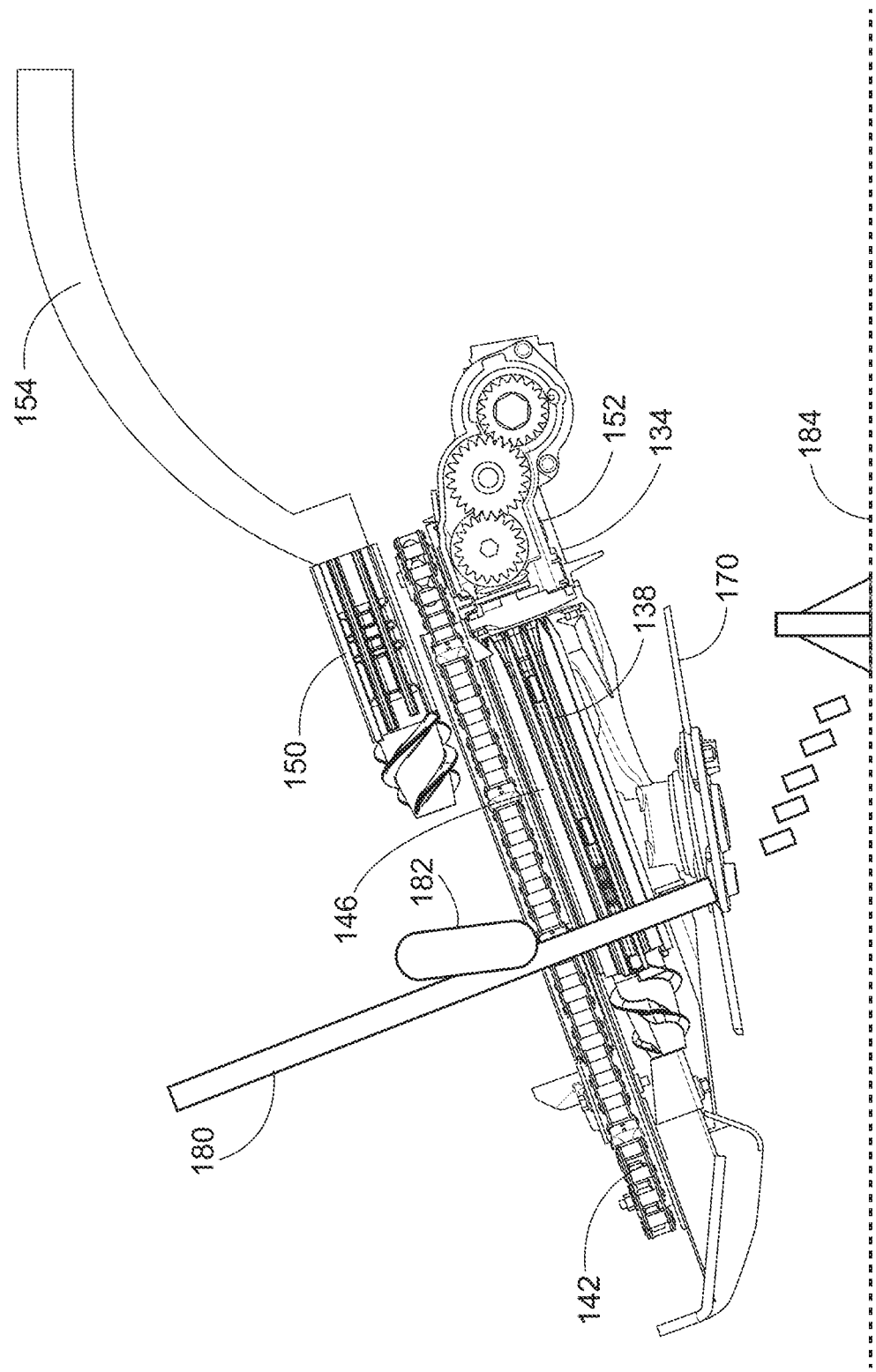

FIG. 8 illustrates that the first and second stalk rolls 136 and 138 direct the cut corn stalk 180 downward toward the rotating blade 170 to further cut the cut corn stalk 180 into short segments. An ear 182 is drawn closer to the first and second plates 144 and 146.

Figure 9:
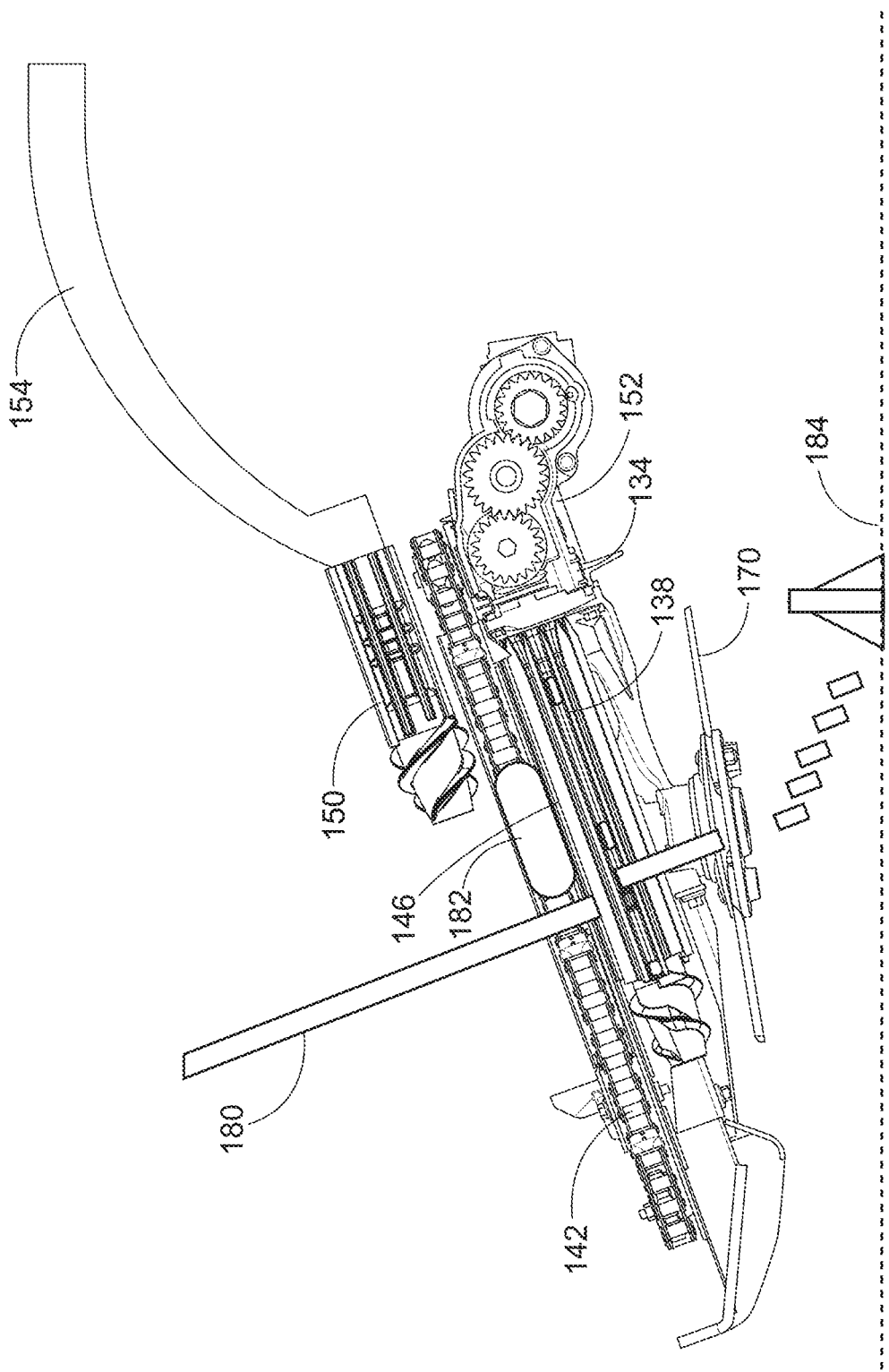

FIG. 9 illustrates that the first and second stalk rolls 136 and 138 continue to direct the cut corn stalk 180 downward toward the rotating blade 170 to further cut the cut corn stalk 180 into short segments. The cut corn stalk 180 approaches the third and fourth stalk rolls 148 and 150. The ear 182 has been separated from the corn stalk 180 by the first and second plates 144 and 146. The ear 180 is being moved along the first and second plates 144 and 146 toward the cross auger 28 by the gathering chains 140 and 142 (to the right in FIG. 9, see FIG. 1). The first gathering chain 140 is positioned between the first stalk roll 136 and the third stalk roll 148, and the second gathering chain 142 is positioned between the second stalk roll 138 and the fourth stalk roll 150.

Figure 10:
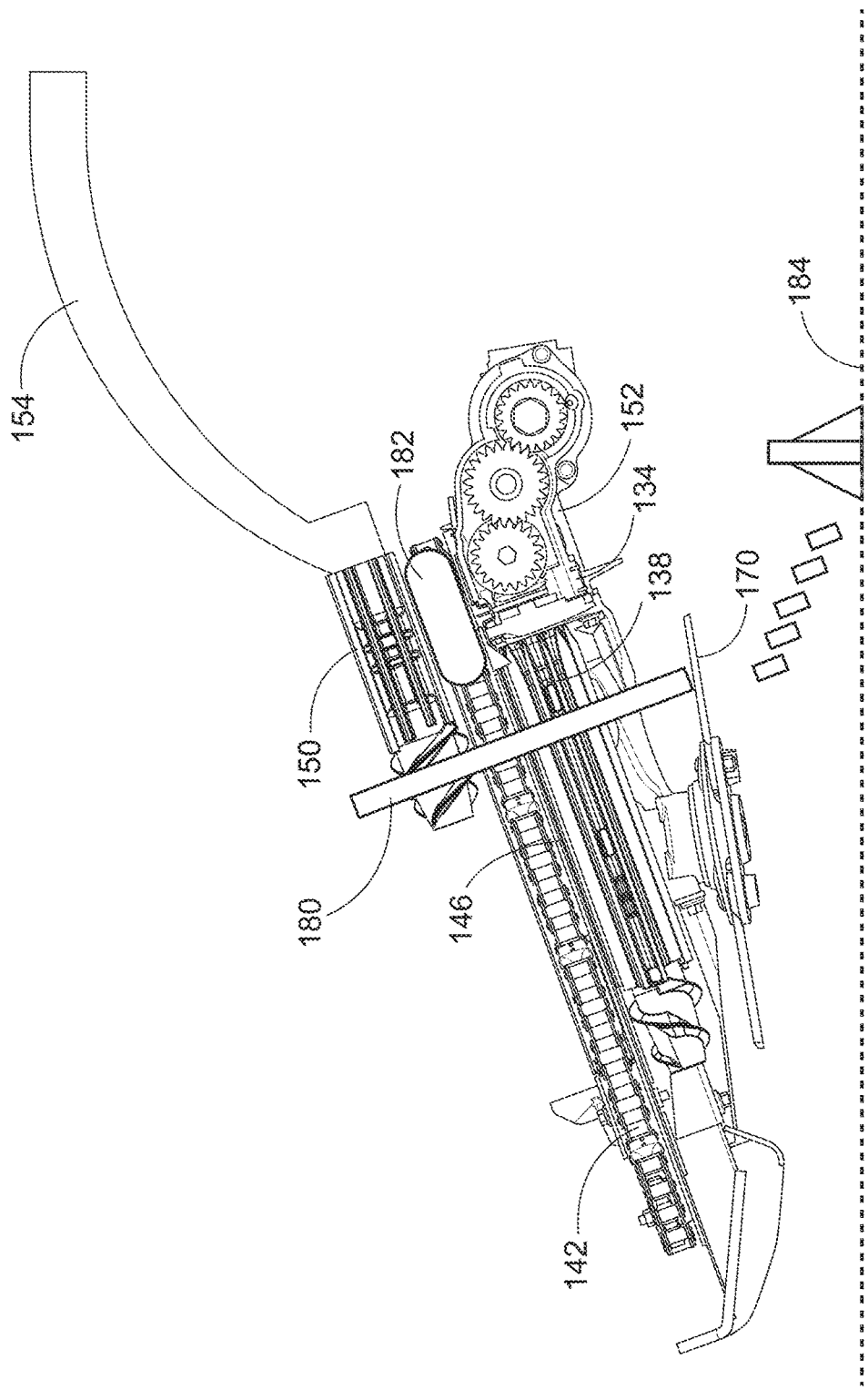

FIG. 10 illustrates that the first and second stalk rolls 136 and 138 continue to direct the cut corn stalk 180 downward toward the rotating blade 170 to further cut the cut corn stalk 180 into short segments. The third and fourth stalk rolls 148 and 150 engage the cut corn stalk 180 and orient the cut corn stalk 180 substantially perpendicular to the first and second plates 144 and 146 and to the rotating blade 170. The ear 180 is being moved further along the first and second plates 144 and 146 toward the cross auger 28 by the gathering chains 140 and 142 (to the right in FIG. 10, see FIG. 1).

Figure 11:
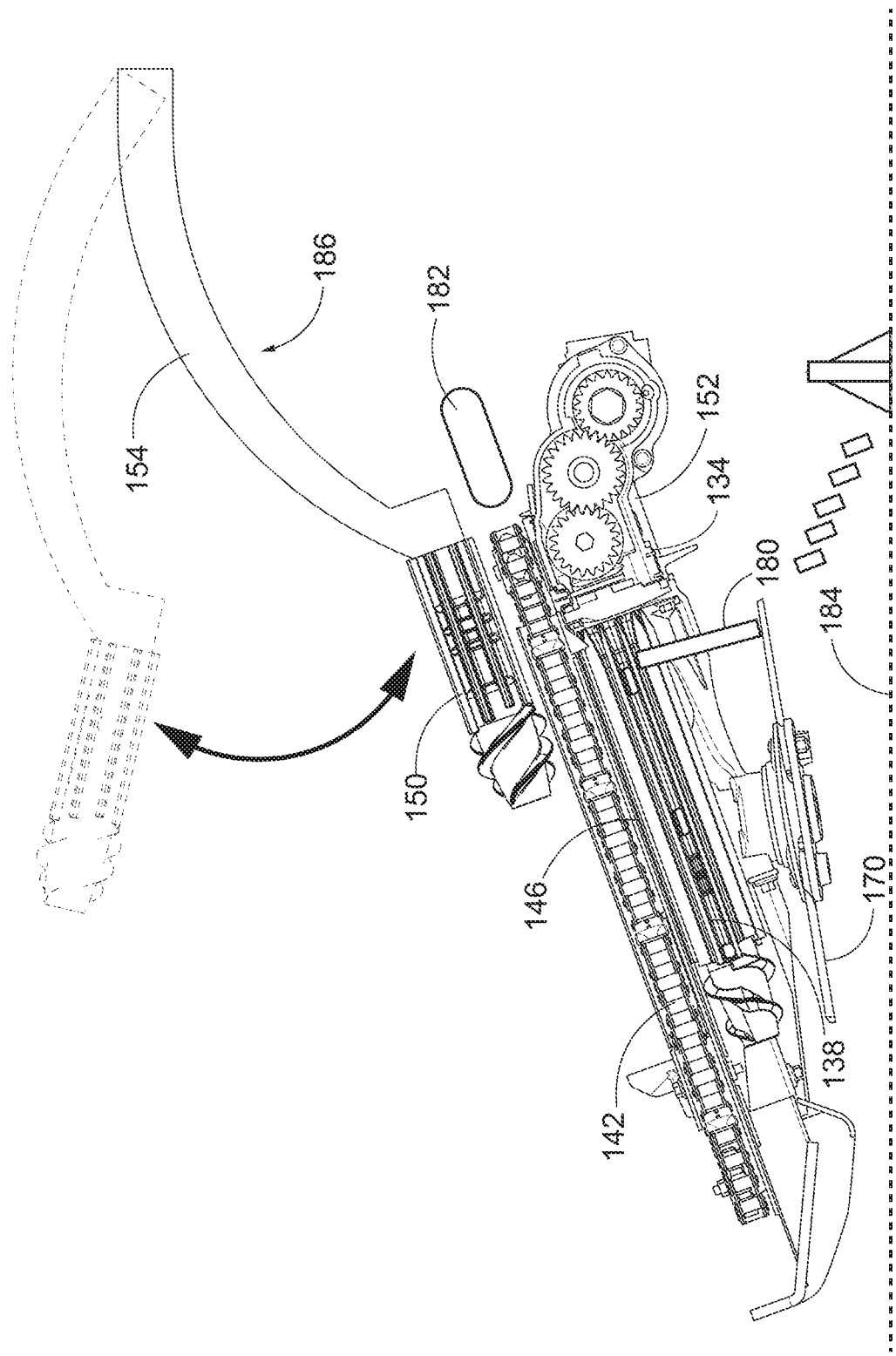

FIG. 11 illustrates that the first and second stalk rolls 136 and 138 continue to direct the cut corn stalk 180 downward toward the rotating blade 170 to further cut the remainder of the cut corn stalk 180 into short segments. The third and fourth stalk rolls 148 and 150 provided stability and support to the cut corn stalk 180 such that the cut corn stalk 180 continued to be processed by the first and second stalk rolls 136 and 138 as well as the rotating blade 170. The ear 180 is moved past the first and second plates 144 and 146 toward the cross auger 28 by the gathering chains 140 and 142 (to the right in FIG. 11, see FIG. 1). The support arm 154 can be rotated up in the direction of arrow 186 to permit servicing of the remaining parts of the stalk roll assembly 130 to the position shown in phantom.

As shown in FIG. 1, the cross auger 28 rotates to move harvested corn ears 82, 182 toward the collection hopper 20. The corn kernels are then stripped off of the harvested corn ears 82, 182 and are directed out the dispensing chute 22. A second work vehicle, such as a wagon, is positioned to receive the corn kernels from the dispensing chute 22.

The third stalk roll 48, 148 and the fourth stalk roll 50, 150 improve the harvesting process of the stalk roll assemblies 30, 130.

What is claimed is:

1. A stalk roll assembly for a corn harvester, the stalk roll assembly comprising:
   a first stalk roll having a first elongate cylinder and being rotatable about a first axis in a first rotational direction, the first stalk roll includes a first front end and a first rear end;
   a second stalk roll having a second elongate cylinder and being rotatable about a second axis in a second rotational direction, opposite the first rotational direction, such that the first and second stalk rolls are configured to move corn stalks toward a ground surface;
   a third stalk roll having a third elongate cylinder and being positioned above the first stalk roll and being rotatable about a third axis in the first rotational direction, the third stalk roll includes a second front end and a second rear end;
   a fourth stalk roll having a fourth elongate cylinder and being positioned above the second stalk roll and being rotatable about a fourth axis in the second rotational direction, such that the third and fourth stalk rolls are configured to move corn stalks toward the ground surface;
   a first plate positioned between the first stalk roll and the third stalk roll;
   a second plate positioned between the second stalk roll and the fourth stalk roll, the first and second stalk rolls being spaced apart to separate corn ears from corn stalks;
   a conveyor positioned between the first plate and the third stalk roll, the conveyor configured to move corn ears toward the corn harvester; and
   a frame having a first portion and a second portion,
   wherein the first stalk roll is coupled to the first portion of the frame and the third stalk roll is coupled to the second portion of the frame,
   wherein the corn harvester is configured to move in a direction of travel,
   wherein the first front end of the first stalk roll extends further forward in the direction of travel than the second front end of the third stalk roll, such that the first stalk roll is configured to engage a first stalk prior to the third stalk roll engaging the first stalk, and
   wherein the second rear end of the third stalk roll extends further rearward than the first rear end of the first stalk roll in the direction of travel.

2. The stalk roll assembly of claim 1, wherein the conveyor is a first conveyor and further comprising a second conveyor positioned between the second plate and the fourth stalk roll, the second conveyor configured to move corn ears toward the corn harvester, and wherein the first stalk roll defines a first axial length and the third stalk roll defines a second axial length, and the first axial length is approximately twice the second axial length.

3. The stalk roll assembly of claim 1, wherein the first stalk roll defines a first axial length and the third stalk roll defines a second axial length, and the first axial length is greater than the second axial length.

4. The stalk roll assembly of claim 1, wherein during operation the first stalk roll is oriented at an acute angle with respect to a ground surface, wherein during operation the third stalk roll is oriented at an acute angle with respect to the ground surface, wherein during operation, and wherein during operation the first stalk roll is positioned closer to the ground surface than the third stalk roll.

5. The stalk roll assembly of claim 1, wherein the first axis is parallel to the second axis and wherein the third axis is parallel to the fourth axis, wherein the first stalk roll defines a first diameter, the second stalk roll defines a second diameter, the third stalk roll defines a third diameter, and the fourth stalk roll defines a fourth diameter, and wherein the first diameter is substantially equal to the third diameter.

6. The stalk roll assembly of claim 5, wherein the first axis is parallel to the third axis and wherein the second axis is parallel to the fourth axis, and wherein the second diameter is substantially equal to the fourth diameter.

7. The stalk roll assembly of claim 1, wherein the first stalk roll includes a plurality of first blades spaced circumferentially around a perimeter of the first elongate cylinder, wherein the second stalk roll includes a plurality of second blades spaced circumferentially around a perimeter of the second elongate cylinder, wherein the third stalk roll includes a plurality of third blades spaced circumferentially around a perimeter of the third elongate cylinder, and wherein the fourth stalk roll includes a plurality of fourth blades spaced circumferentially around a perimeter of the fourth elongate cylinder.

8. A corn harvester comprising:
 a work vehicle configured to move along a ground surface;
 a crop divider configured to separate adjacent rows of corn stalks;
 a first stalk roll having a first elongate cylinder and being rotatable about a first axis in a first rotational direction, the first stalk roll defining a first axial length;
 a first plate positioned above the first stalk roll;
 a second stalk roll having a second elongate cylinder and being rotatable about a second axis in a second rotational direction, opposite the first rotational direction, such that the first and second stalk rolls are configured to move corn stalks toward a ground surface;
 a second plate positioned above the second stalk roll, the first and second stalk rolls being spaced apart to permit corn stalks to move between the first and second plates and to separate corn ears from corn stalks;
 a third stalk roll having a third elongate cylinder and being rotatable about a third axis in the first rotational direction, the third stalk roll being positioned above the first plate, the third stalk roll defining a second axial length, and the first axial length is greater than the second axial length, such that the first stalk roll is configured to engage the first corn stalk prior to the third stalk roll engaging the first corn stalk;
 a fourth stalk roll having a fourth elongate cylinder and being rotatable about a fourth axis in the second rotational direction, such that the third and fourth stalk rolls are configured to move corn stalks toward the ground surface, the fourth stalk roll being positioned above the second plate;
 a collection hopper configured to store harvested corn ears;
 a conveyor configured to move separated corn ears toward the hopper, the conveyor positioned between the first plate and the third stalk roll; and
 a frame having a first portion and a second portion,
 wherein the first stalk roll is coupled to the first portion of the frame and the third stalk roll is coupled to the second portion of the frame.

9. The corn harvester of claim 8, wherein the corn harvester is configured to move in a direction of travel, wherein the first stalk roll includes a first front end and a first rear end, and the third stalk roll includes a second front end and a second rear end, wherein the first front end extends further forward than the second front end in the direction of travel, such that the first stalk roll is configured to engage a first stalk prior to the third stalk roll engaging the first stalk, and wherein the second rear end extends further rearward than the first rear end in the direction of travel.

10. The corn harvester of claim 9, wherein during operation the first stalk roll is oriented at an acute angle with respect to a ground surface, wherein during operation the third stalk roll is oriented at an acute angle with respect to the ground surface, and wherein during operation the entire first stalk roll is positioned closer to the ground surface than the entire third stalk roll.

11. The corn harvester of claim 8, wherein the first axis is parallel to the second axis and wherein the third axis is parallel to the fourth axis, wherein the first stalk roll defines a first diameter, the second stalk roll defines a second diameter, the third stalk roll defines a third diameter, and the fourth stalk roll defines a fourth diameter, and wherein the first diameter is substantially equal to the third diameter.

12. The corn harvester of claim 11, wherein the first axis is parallel to the third axis and wherein the second axis is parallel to the fourth axis, and wherein the second diameter is substantially equal to the fourth diameter.

13. The corn harvester of claim 8, wherein the first stalk roll includes a plurality of first blades spaced circumferentially around a perimeter of the first elongate cylinder, wherein the second stalk roll includes a plurality of second blades spaced circumferentially around a perimeter of the second elongate cylinder, wherein the third stalk roll includes a plurality of third blades spaced circumferentially around a perimeter of the third elongate cylinder, and wherein the fourth stalk roll includes a plurality of fourth blades spaced circumferentially around a perimeter of the fourth elongate cylinder.

14. A stalk roll assembly for a corn harvester configured to move along a ground surface in a direction of travel, the stalk roll assembly comprising:
 a frame having a first portion and a second portion;
 a first stalk roll having a first elongate cylinder and extending at an acute angle with respect to the ground surface, the first stalk roll being rotatable about a first axis in a first rotational direction, the first stalk roll defining a first axial length, the first stalk roll being coupled to the first portion of the frame, the first stalk roll including a first front end and a first rear end;
 a second stalk roll having a second elongate cylinder and extending at an acute angle with respect to the ground surface, the second stalk roll being rotatable about a second axis in a second rotational direction, opposite the first rotational direction, such that the first and second stalk rolls are configured to move corn stalks toward a ground surface, the second stalk roll defining a second axial length;
 a third stalk roll having a third elongate cylinder and extending at an acute angle with respect to a ground surface, the third stalk roll being rotatable about a third axis in the first rotational direction, the third stalk roll defining a third axial length, and the first axial length is greater than the third axial length, the third stalk roll being coupled to the second portion of the frame, the third stalk roll including a second front end and a second rear end; and
 a fourth stalk roll having a fourth elongate cylinder and extending at an acute angle with respect to the ground surface, the fourth stalk roll being rotatable about a fourth axis in the second rotational direction, such that the third and fourth stalk rolls are configured to move corn stalks toward the ground surface, the fourth stalk roll defining a fourth axial length, and the second axial length is greater than the fourth axial length,
 wherein the first stalk roll is positioned between the ground surface and the third stalk roll,
 wherein the second stalk roll is positioned between the ground surface and the fourth stalk roll,
 wherein the first front end extends further forward than the second front end in the direction of travel, such that the first stalk roll is configured to engage a first stalk prior to the third stalk roll engaging the first stalk, and wherein the second rear end extends further rearward than the first rear end in the direction of travel.

15. The stalk roll assembly of claim 14, further comprising a first plate positioned between the first stalk roll and the third stalk roll, and a second plate positioned between the second stalk roll and the fourth stalk roll, the first and second stalk rolls being spaced apart to permit corn stalks to move between the first and second plates and to separate corn ears from corn stalks, and further comprising a conveyor positioned between the first plate and the third stalk roll, the conveyor configured to transport harvested corn ears toward a collection area.

16. The stalk roll assembly of claim 14, further comprising a first conveyor positioned between the first plate and the third stalk roll, and a second conveyor positioned between the second plate and the fourth stalk roll, wherein the first and second conveyors are configured to transport harvested corn ears toward a collection area.

17. The stalk roll assembly of claim 14, further comprising a frame having a first portion and a second portion, wherein the first stalk roll is coupled to the first portion of the frame and the third stalk roll is coupled to the second portion of the frame, the first stalk roll defining a first axial length, the second stalk roll defining a second axial length, the third stalk roll defining a third axial length, and the fourth stalk roll defining a fourth axial length, the third axial length is approximately half the first axial length such that in operation the first stalk roll is configured to engage a first stalk prior to the third stalk roll engaging the first stalk, and wherein the second stalk roll is coupled to the first portion of the frame and the fourth stalk roll is coupled to the second portion of the frame, the fourth length is approximately half the second axial length such that in operation the second stalk roll is configured to engage the first corn stalk prior to the fourth stalk roll engaging the first corn stalk.

18. The stalk roll assembly of claim 14, wherein the first axis is parallel to the second axis, and wherein the third axis is parallel to the fourth axis, wherein the first stalk roll defines a first diameter, the second stalk roll defines a second diameter, the third stalk roll defines a third diameter, and the fourth stalk roll defines a fourth diameter, and wherein the first diameter is substantially equal to the third diameter and the second diameter is substantially equal to the fourth diameter.

* * * * *